(12) United States Patent
Jägenstedt

(10) Patent No.: US 11,117,204 B2
(45) Date of Patent: Sep. 14, 2021

(54) POWER TOOL

(71) Applicant: HUSQVARNA AB, Huskvarna (SE)

(72) Inventor: Patrik Jägenstedt, Tenhult (SE)

(73) Assignee: HUSQVARNA AB, Huskvarna (SE)

( * ) Notice: Subject to any disclaimer, the term of this patent is extended or adjusted under 35 U.S.C. 154(b) by 539 days.

(21) Appl. No.: 15/308,911

(22) PCT Filed: May 6, 2014

(86) PCT No.: PCT/EP2014/059185
§ 371 (c)(1),
(2) Date: Nov. 4, 2016

(87) PCT Pub. No.: WO2015/169342
PCT Pub. Date: Nov. 12, 2015

(65) Prior Publication Data
US 2017/0080506 A1    Mar. 23, 2017

(51) Int. Cl.
| | | |
|---|---|---|
| B23D 59/00 | (2006.01) | |
| B25F 5/00 | (2006.01) | |
| A01G 3/053 | (2006.01) | |
| B27B 17/00 | (2006.01) | |
| B23D 57/02 | (2006.01) | |

(52) U.S. Cl.
CPC ........... B23D 59/001 (2013.01); A01G 3/053 (2013.01); B23D 57/023 (2013.01); B25F 5/00 (2013.01); B27B 17/00 (2013.01)

(58) Field of Classification Search
CPC ....... B23D 59/001; B23D 57/023; B25F 5/00; A01G 3/053; B27B 17/00

USPC ............................................................ 173/1
See application file for complete search history.

(56) References Cited

U.S. PATENT DOCUMENTS

| | | |
|---|---|---|
| 3,097,571 A | 7/1963 | Kaman |
| 3,744,301 A | 7/1973 | Arave |
| 4,499,739 A | 2/1985 | Matsuoka et al. |
| 5,428,966 A | 7/1995 | Alsenz |
| 5,904,049 A | 5/1999 | Jaster et al. |

(Continued)

FOREIGN PATENT DOCUMENTS

| | | |
|---|---|---|
| AU | 2014100230 A4 | 4/2014 |
| CN | 102029586 A | 4/2011 |

(Continued)

OTHER PUBLICATIONS

International Search Report and Written Opinion for International Application No. PCT/US2014/031799 dated Aug. 22, 2014.

(Continued)

*Primary Examiner* — Thanh K Truong
*Assistant Examiner* — David G Shutty
(74) *Attorney, Agent, or Firm* — Burr & Forman, LLP

(57) ABSTRACT

A power tool (100), such as a chainsaw, comprising means (230) for driving said power tool (100) and a controller (210). The power tool comprises a movement sensor (220) and the controller (210) is configured to receive a signal from said movement sensor (220), determine if said signal is a signal indicating a movement, determine a time wherein no signal indicating a movement is received, determine if said time exceeds a time period, and if so, disable said driving means (230).

19 Claims, 2 Drawing Sheets

(56) References Cited

U.S. PATENT DOCUMENTS

| | | | |
|---|---|---|---|
| 6,021,854 A * | 2/2000 | Scarola | B25F 5/021 |
| | | | 173/141 |
| 6,330,503 B1 | 12/2001 | Sharp et al. | |
| 7,182,148 B1 * | 2/2007 | Szieff | B25B 21/00 |
| | | | 173/171 |
| 7,664,679 B2 | 2/2010 | Stefanik et al. | |
| 7,828,077 B1 * | 11/2010 | Miller | B23Q 5/10 |
| | | | 173/18 |
| 8,049,636 B2 | 11/2011 | Buckingham et al. | |
| 8,360,166 B2 | 1/2013 | Iimura et al. | |
| 8,505,798 B2 * | 8/2013 | Simonelli | B25C 1/008 |
| | | | 173/162.1 |
| 9,690,362 B2 * | 6/2017 | Leimbach | A61B 17/068 |
| 2004/0181951 A1 * | 9/2004 | Wittke | B27B 17/00 |
| | | | 30/382 |
| 2005/0167130 A1 * | 8/2005 | Setter | B25B 23/1405 |
| | | | 173/1 |
| 2006/0049920 A1 | 3/2006 | Sadler et al. | |
| 2007/0195074 A1 | 8/2007 | Gelissen | |
| 2009/0062804 A1 * | 3/2009 | Runquist | E21B 44/02 |
| | | | 606/80 |
| 2009/0236387 A1 * | 9/2009 | Simonelli | B25C 5/1668 |
| | | | 227/8 |
| 2009/0251330 A1 * | 10/2009 | Gerold | B25C 1/08 |
| | | | 340/12.22 |
| 2010/0038395 A1 | 2/2010 | Krondorfer et al. | |
| 2010/0064532 A1 * | 3/2010 | Wittke | B27G 19/003 |
| | | | 30/382 |
| 2010/0257743 A1 * | 10/2010 | George | B27B 17/083 |
| | | | 30/383 |
| 2011/0186319 A1 * | 8/2011 | Pellenc | B27G 19/003 |
| | | | 173/176 |
| 2011/0197458 A1 | 8/2011 | Karrar et al. | |
| 2011/0265334 A1 * | 11/2011 | Van Bijsterveldt | B27G 19/003 |
| | | | 30/382 |
| 2012/0000682 A1 * | 1/2012 | Grazioli | B25F 5/00 |
| | | | 173/1 |
| 2012/0036725 A1 * | 2/2012 | Osborne | B27B 17/083 |
| | | | 30/383 |
| 2013/0193891 A1 * | 8/2013 | Wood | H02P 6/08 |
| | | | 318/434 |
| 2013/0219724 A1 | 8/2013 | Werner | |
| 2014/0007435 A1 * | 1/2014 | Untermann | H02K 7/02 |
| | | | 30/277.4 |
| 2014/0047722 A1 * | 2/2014 | Onose | B25F 5/02 |
| | | | 30/383 |
| 2014/0089243 A1 * | 3/2014 | Oppenheimer | G08B 21/0275 |
| | | | 706/46 |
| 2014/0132392 A1 * | 5/2014 | Kady | G06F 21/81 |
| | | | 340/5.54 |
| 2014/0165946 A1 * | 6/2014 | Yanagihara | B25F 5/00 |
| | | | 123/179.1 |
| 2014/0215833 A1 * | 8/2014 | Heinzelmann | A01G 3/04 |
| | | | 30/216 |
| 2014/0263535 A1 * | 9/2014 | Rajani | B25C 1/06 |
| | | | 227/2 |
| 2015/0360305 A1 * | 12/2015 | Willgert | B27B 17/00 |
| | | | 30/272.1 |
| 2016/0145974 A1 * | 5/2016 | Tahoun | E21B 47/00 |
| | | | 175/50 |
| 2017/0046663 A1 * | 2/2017 | Wong | B25F 5/00 |
| 2019/0361694 A1 * | 11/2019 | Gordon | G06F 1/169 |

FOREIGN PATENT DOCUMENTS

| | | | | |
|---|---|---|---|---|
| CN | 102785233 A | | 11/2012 | |
| DE | 102009040436 A1 | | 3/2011 | |
| DE | 102010007714 B3 | | 6/2011 | |
| EP | 0148102 A3 | | 6/1986 | |
| EP | 2402122 A2 | | 1/2012 | |
| GB | 1221130 A | * | 2/1971 | A01G 3/053 |
| JP | H06-124119 A | | 5/1994 | |
| JP | 2002034870 A | | 2/2002 | |
| JP | 2010075472 A | | 4/2010 | |
| JP | 2011041621 A | | 3/2011 | |
| JP | 2011041621 A | * | 3/2011 | A01G 3/053 |
| JP | 2012024189 A | | 2/2012 | |
| JP | 2012055462 A | | 3/2012 | |
| WO | 2011/086745 A1 | | 7/2011 | |

OTHER PUBLICATIONS

International Search Report and Written Opinion for International Application No. PCT/EP2014/059185 dated Jan. 29, 2015.
International Preliminary Report on Patentability for International Application No. PCT/US2014/031799 dated Sep. 29, 2015.
International Preliminary Report on Patentability for International Application No. PCT/EP2014/059185 dated Nov. 8, 2016.
Deboli, R., et al., "Pressure Distribution Measuremt Over Chain Saw Handles by the Application of a New Capaitive Matrix," pp. 1-8 (2002).
Laszlo, H. E., "The Vibration Exposure of Small Horticultural Tools and Its Reduction," Technical Department of Corvinus University of Budapest, pp. 1-21 (2010).

* cited by examiner

POWER TOOL

TECHNICAL FIELD

This application relates to a method and an electric power tool for improved operational safety for the electric power tool, and in particular to a method and an electric chainsaw for improved operational safety for the electric chainsaw.

BACKGROUND

Chainsaws and also hedge cutters may be dangerous if left unattended when being active. A person, such as a child, could accidentally activate the chainsaw and incur injuries especially if it is not apparent that the chainsaw is active.

It is easy to see that a petrol-driven chainsaw is active as the engine will cause both sounds and vibrations, but it may not be so easy to see that an electric chainsaw is active as it does not make any sound or vibrations when not being actively used.

Prior art solutions for making the operation of an electric power tool safer indicate the active state through an LED or other light being activated. Such lights may be difficult to see, and possibly not understood by for example a child. Such light solutions thus suffer from being difficult to see and/or possibly understood and are only suitable for trained operators.

Another prior art solution is to determine how long a power tool has been inactive since the last push on an activation button. If the power tool has not been actively used for a time period the power tool is switched off. This suffers from the drawback that the power tool may be switched off when it is carried around for alter use. To have to turn the power tool back on again will be frustrating and sometimes can incur further risk. One example where a power tool is carried around for later use is for example an arborist climbing a tree carrying his chainsaw. Should the chainsaw be switched off it could delay the arborist's work or incur further risk as the arborist may have to change his position high up in the tree to be able to reactivate the chainsaw.

Hedge cutters suffer from similar disadvantages as chainsaws as they have a similar construction.

The same problems are also applicable to other work tools such as electric jig saws, circular saws, drills, edge trimmers, grass trimmers, lawnmowers, mills, and power planers to mention a few power tools that could potentially be misused to cause serious injuries, both to persons and to matter.

There is thus a need for a manner of enabling safe operation of an electric power tool in situations where the electric power tool is not being used and may have mistakenly left active unattended while being in an active mode.

SUMMARY

It is an object of the teachings of this application to overcome the problems listed above by providing a power tool comprising means for driving said power tool and a controller, said power tool being characterized in that said power tool further comprises a movement sensor and the controller being configured to receive a signal indicating a movement from said movement sensor, determine a time wherein no signal indicating a movement is received, determine if said time exceeds a time period, and if so, disable said driving means.

It is also an object of the teachings of this application to overcome the problems listed above by providing a power tool comprising means for driving said power tool and a controller, said power tool being characterized in that said power tool further comprises a movement sensor and the controller being configured to receive a signal from said movement sensor, determine if said signal is a signal indicating a movement, determine a time wherein said signal is not indicating a movement, determine if said time exceeds a time period, and if so, disable said driving means.

In such embodiments, the controller and the robotic work tool is configured to determine a period within which no signal indicating a movement is received from the movement sensor, as may be the case when the movement sensor is not sending a signal, as well as when the movement sensor is sending a signal that indicates that no movement is made and also that a signal from the movement sensor is analyzed and it is determined that the movement sensor does not detect a movement.

One benefit of such a power tool is that both safety and ease of handling is provided which is not present in prior art solutions. By not determining whether a power tool is actively used based on the actual activation of the tool, but instead or additionally detecting if it is being carried around and thereby assuming that the tool is currently being used or about to be used, the power tool will not be switched off unnecessarily while still assuring that an unattended power tool is switched off. This provides for both safe handling and for ease of use.

In one embodiment the power tool is a chainsaw. Chainsaws need to be handled with care or they might cause damage. This is a result of that the chainsaw has a long exposed blade carrying the cutting chain and the exposure of the cutting chain and the power of the cutting chain increase the risk of someone being injured if the chainsaw is not handled properly. The inherent risk in handling chainsaws is apparent from the need to have a special handling license to be allowed to handle a chainsaw (at least professionally) in many jurisdictions, for example in Sweden.

In one embodiment the power tool is a hedge cutter. Hedge cutters have a similar construction as chainsaws and therefore also suffer from similar risks as has been discussed above for chainsaws.

In one embodiment the power tool is an electric jig saw, circular saw, drill, edge trimmer, grass trimmer, lawnmower, mill or power planer.

It is also an object of the teachings of this application to overcome the problems listed above by providing a method for use in a power tool comprising means for driving said power tool and a controller, said power tool being characterized in that said power tool further comprises a movement sensor, said method comprising receiving a signal indicating a movement from said movement sensor, determining a time wherein no signal indicating a movement is received, determining if said time exceeds a time period, and if so, disabling said driving means.

It is also an object of the teachings of this application to overcome the problems listed above by providing a method for use in a power tool comprising means for driving said power tool and a controller, said power tool being characterized in that said power tool further comprises a movement sensor, said method comprising receiving a signal from said movement sensor, determining if said signal is a signal indicating a movement, determining a time wherein said signal is not indicating a movement, determining if said time exceeds a time period, and if so, disabling said driving means.

The inventors of the present invention have realized, after inventive and insightful reasoning that by utilizing a movement sensor, such as an accelerometer, to detect an absence of movement it can be detected when a power tool is put down and it can be assumed that the power tool is no longer being used. To detect an absence of movements and to inactivate a power tool if it is being stationary goes against a general understanding in the field of power tools as a workman often wants to be able to put a tool down to later pick it up and continue operation, but the teachings herein provide a simple and elegant manner for providing both safety and easy handling, that favours safety without compromising easy handling.

Also, detecting absence of movements is not a common use for accelerometers—esp. in the field of power tools—which are used to detect accelerations, for example to safe guard against accidental use such as when slipping with a power tool. The movement sensor is thus used to detect an absence of movement or vibration (possibly over a prolonged time) and in response thereto disable the operation of the power tool. This is in contrast to normal use of accelerometers which is to detect movements and take appropriate actions accordingly (such as slip control or gesture control). Alternatively, gyroscopes may have been used to detect a direction or position of a tool and in response thereto inactivate the tool if the direction or angle is incorrect. Again, detecting absence of movement and ignoring direction goes against normal use of such gyroscopes.

Furthermore, the use of power tools and the potential risks associated is a longstanding problem that has been known since the birth of power tools.

It should also be noted that power tools, and especially chainsaws, have safety concerns that are not present in other electric tools, and the technical field of power tools, and especially the technical field of electric chainsaws, is thus limited by these safety issues which should not be taken lightly as they can cause serious personal injuries.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
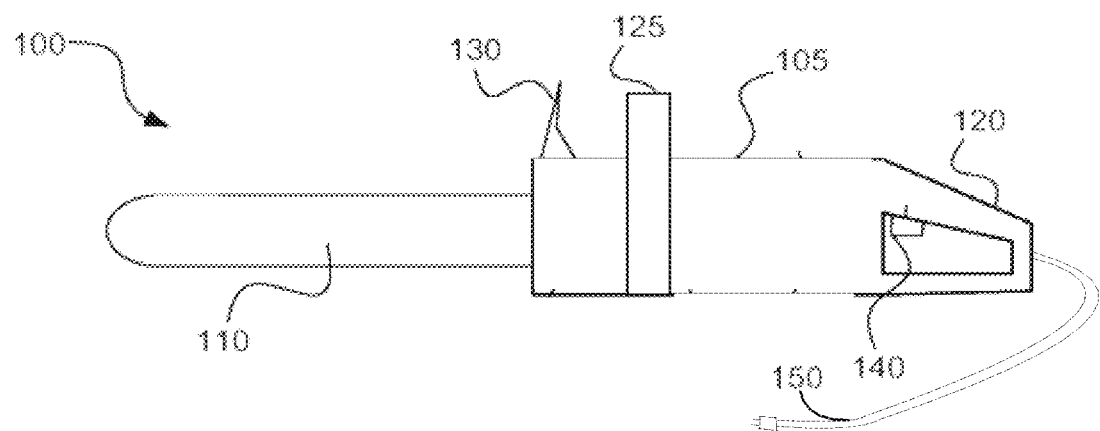
FIG. 1 shows an overview of a power tool being exemplified by a chainsaw according to one embodiment of the teachings of this application.

FIG. 1 shows an overview of a power tool 100. The power tool 100 is a chainsaw having a casing 105 and an operative tool component 110, which in the case of the chainsaw 100 is the cutting chain being carried by a blade. It should be noted that, although the teachings herein will be disclosed referring to a chainsaw, the teachings herein may also be used in other power tools such as electric jig saws, circular saws, drills, hedge cutters and edge trimmers, lawnmowers, mills, power planers. The chainsaw 100 also has a handle 120 and an operating button 140. A user can thus operate the chainsaw 100 by holding it in the handle 120 and activating the operative tool component by for example pushing the operating button 140. In the example of a chainsaw the power tool has a second handle 125.

The chainsaw 100 also has a power source 150. The power source may be internal (such as a battery as in the example of FIG. 2) or external such as power being provided through a power cable (as in the example of FIG. 1). The power source may also be a combination of an external and an internal power source.

The chainsaw 100 also has a chain guard 130 which also operates as an active mode switch. A user can thus put the chainsaw 100 in an active mode by pushing the chain guard towards the chain 110 and in a disabled mode by pushing the chain guard towards the handle 125. In addition to the active mode switch 130 (or in other power tools) an on/off switch may be arranged—especially for battery operated devices. For the purpose of the teachings herein the on/off switch will be considered to be an active mode switch 130.

Such switches are arranged to put the power tool in an operating mode or a disabled mode. In the operating mode the power tool 100 may be used by pushing the operating button 140.

On/off switches are especially used in battery operated power tools to enable a user to save battery when the tool is not being used for longer periods. On/off switches may also be used for power tools having external power sources.

Figure 2:
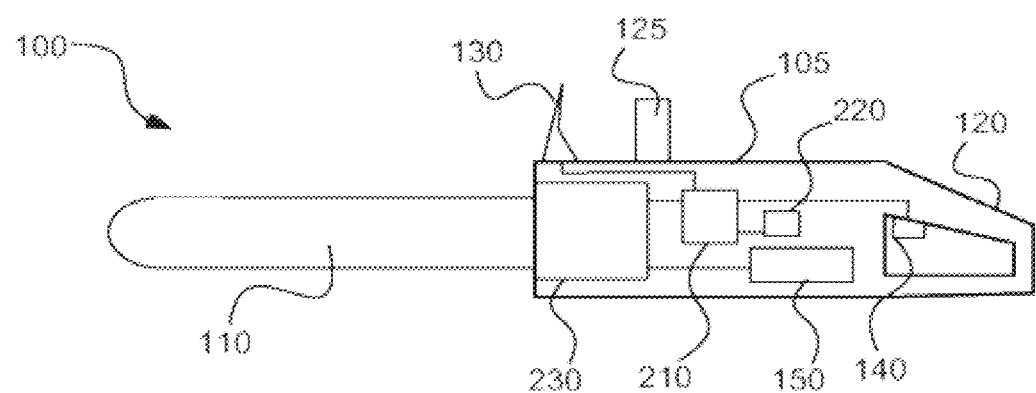
FIG. 2 shows a schematic view of components of a power tool being exemplified by a chainsaw according to one embodiment of the teachings of this application.

FIG. 2 shows a schematic view of components of a power tool being exemplified by a chainsaw 100, such as the chainsaw 100 of FIG. 1, according to one embodiment of the teachings of this application. The power tool may also be a hedge cutter or another power tool as has been discussed in the above.

The chainsaw 100 has a motor 230 for driving the operative component 110. The motor 230 is connected to the power source 150 (being a battery in the example of FIG. 2).

Other means for driving the operative component are possible, such as a petrol-driven engine, a pneumatic device to mention some examples. The teachings herein may also be incorporated into power tools not being electric for added security.

The chainsaw 100 also comprises a controller 210. The controller may be implemented as a central processing unit combined with a computer-readable memory for storing operating instructions for the chainsaw, possibly in addition to storing operating data. The controller 210 may also be implemented as an electronic switch network or programmable logic controller. As would be apparent, a controller may be implemented in a number of ways, and both analogue and digital variants exist.

The controller 210 is connected to the motor 230 and the operating button 140. The controller 210 is also connected to the active mode switch 130 if such a switch is included in the power tool 100.

The chainsaw 100 further comprises a movement sensor 220. The movement sensor may be implemented as an accelerometer or a gyro. It would be apparent that many variants exist for implementing a movement sensor 220. The movement sensor 220 is connected to the controller 210.

As a movement of the chainsaw 100 is sensed by the movement sensor 220, the movement sensor sends a signal to the controller 210 indicating that a movement is sensed, and possibly details about the movement (direction, amplitude, etc). The controller 210 is configured to determine the type of movement being detected based on the data provided from the movement sensor 220.

It should be noted that the movement sensor may be enabled to send signals continuously to the controller and that such signals are analyzed or interpreted by the controller to determine if a movement is occurring or not. For the purpose of this application a signal indicating a movement is a signal that may later be analyzed to determine that the movement sensor was actually subjected to a movement (or vibration).

The movement sensor may thus send signals to the controller also during the time period when a signal indicating a movement is not received.

In one embodiment the movement sensor comprises a processor and is configured to determine whether the movement sensor is being moved or not and if not transmit a signal indicating no movement to the controller 110. The controller 110 then determines that a signal received is a signal indicating no movement by determining that the signal has been sent from the movement sensor. In one aspect of such an embodiment the processor of the movement sensor can be seen as being comprised in the controller 110, the controller 110 thus being an arrangement of multiple processors that may or may not be mounted on a same circuit board.

The movement sensor 220 may also be configured to detect vibrations. Accelerometers are one example of movement sensors capable of detecting vibrations. Some power tools are necessarily not moved around when being used, or only moved very slowly and as such their activity can not be accurately detected by only detecting movements. One such example is a power drill for drilling through a hard surface. Such drilling will be performed very slowly and the movement may not be sufficient to detect the movement.

In the description below no difference will be made between a movement and a vibration for ease of reading.

It should be noted that as it is an actual movement that is being detected, and not a position, it does not matter how the chainsaw 100 is put down. It could just as well be hung or otherwise placed.

The controller 210 is also configured to determine that a movement has not been detected during a time period and in response thereto initiate a disabled mode for the chainsaw 100.

When the chainsaw is in a disabled mode any input received from the operating button 140 will be received by the controller 210, but not processed to operate the chainsaw 100. In other words, any push on the operating button 140 will be ignored by the chainsaw when the chainsaw is in the disabled mode.

This enables for a safer operation in that if a user puts down his chainsaw 100 and forgets to inactivate it (such as by not deactivating the active mode switch 130 or turning of the on/off switch) the chainsaw 100 can not be used involuntarily, such as by a child passing by.

To prevent that the chainsaw 100 is disabled even when the user simply holds the chainsaw 100 still, the time period during which no movement has been detected may be set according to the intended use of the power tool 100. For power tools such as chainsaws 100, which are not often put down for longer periods of time, the time period may be short, for example up to 5 seconds, up to 10 seconds, up to 30 seconds or up to 1 minute.

For power tools 100 such as power drills, which are often put down for longer periods of time, the time period may be short, for example 30 seconds, 1 minute up to 5 minutes, up to 10 minutes or up to 30 minutes.

The chainsaw 100 may be reactivated by the user providing a reactivation signal. The controller 210 is thus configured to receive a reactivation signal and in response thereto put the chainsaw 100 in an active mode.

In one embodiment the reactivation signal may be provided through the activation switch 130. In one embodiment the activation switch is a push release switch in which case the switch 130 only needs to be pushed to provide the reactivation signal. In another embodiment the activation switch 130 is to be flipped back and forth to provide the reactivation signal. In one example the chain guard 130 is to be pushed towards the handle 125 and back again towards the blade 110 to provide the reactivation signal.

In one embodiment the reactivation signal may be provided through turning the chainsaw 100 off and on again.

In one embodiment the reactivation signal may be provided through the activation switch 130 or the operating button 140 or a combination of the activation switch 130 and the operating button 140 by pressing the switch and/or button in a predetermined pattern. For example, the reactivation signal may comprise a series of short activations of the operating button 140, such as three consecutive clicks.

In one embodiment the controller 210 comprises a clock function for receiving the time of day possibly including the date. In such an embodiment the controller may adapt the time period for determining that no movement has been detected based on the time of day (possibly including the date—the date indicating a working day or not). In such an embodiment the time period may thus be shortened if it is determined that the current time is outside working hours as it can be more safe to assume that the tool is not being used outside working hours. This is beneficial for use with professional power tools being used mostly inside working hours. Alternatively, in another such embodiment the time period may be extended if it is determined that the current time is outside working hours as it can be more safe to assume that the tool is not being used during working hours. This is beneficial for use with private power tools being used mostly outside working hours.

Figure 3:
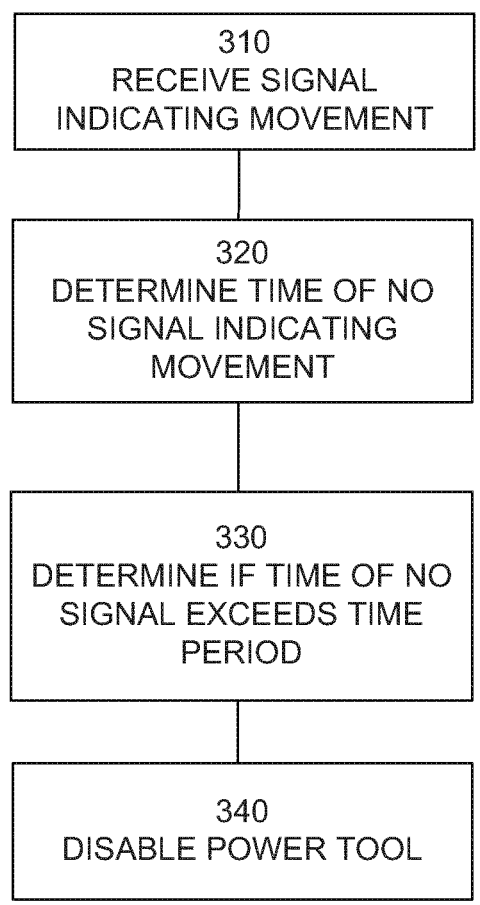
FIG. 3 shows a flowchart for a general method according to one embodiment of the teachings of this application.

FIG. 3 shows a flowchart for a general method according to one embodiment of the teachings of this application.

The movement sensor at least registers a movement (or vibration signal as the chainsaw is activated/switched on) and the controller of the chainsaw receives 310 a signal indicating a movement (or vibration) from the movement sensor. The controller starts a timer to determine a time 320 wherein no signal is received. If a signal is received the timer is reset. The controller then determines 330 if the time of no signal is greater than a time period, such as discussed in the above, the controller disables 340 the driving means, thereby disabling and rendering the chainsaw inoperable.

As has been noted above, the teachings herein may also be used in other power tools such as electric jig saws, circular saws, drills, hedge cutters and edge trimmers, lawn-mowers, mills, power planers.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A chainsaw comprising:
a driving means for driving a cutting portion of the chainsaw;
a movement sensor configured to sense movement of an entirety of the chainsaw;
an active mode switch comprising a chain guard associated with the cutting portion of the chainsaw, the active mode switch being configured to be actuated into an active position or a disabled position; and
a controller configured to:
activate said driving means to permit driving of the cutting portion in response to the active mode switch being in the active position and an operating button being depressed;
disable said driving means from driving the cutting portion in response to the active mode switch being in the disabled position;
receive a signal, via the movement sensor, indicating movement of the chainsaw;
determine a time period during which an absence of receiving the signal indicates a corresponding absence of movement of the chainsaw;
with the active mode switch in the active position, disable said driving means if the time period exceeds a predefined time period;
maintain the driving means disabled, in response to the time period exceeding the predefined time period, until a reactivation signal is received; and
reactivate the driving means to permit driving of the cutting portion in response to receiving the reactivation signal,
wherein the reactivation signal is provided responsive to user actuation of the active mode switch of the chainsaw to the disabled position followed by movement of the active mode switch to the active position.

2. The chainsaw according to claim 1, wherein the controller is further configured to disable said driving means by switching off said chainsaw.

3. The chainsaw according to claim 1, wherein the signal indicating movement indicates a vibration.

4. The chainsaw according to claim 1, wherein the controller is further configured to determine a time of day and adapt the predefined time period based on the time of day.

5. The chainsaw according to claim 1, wherein the reactivation signal is received from an on/off switch in combination with the chain guard.

6. The chainsaw according to claim 1, wherein the chainsaw is electric and said driving means for driving said chainsaw is a motor.

7. A chainsaw comprising:
a driving means for driving a cutting portion of the chainsaw;
a movement sensor configured to sense movement of an entirety of the chainsaw;
an active mode switch comprising a chain guard associated with the cutting portion of the chainsaw, the active mode switch being configured to be actuated into an active position or a disabled position; and
a controller configured to:
activate said driving means to permit driving of the cutting portion in response to the active mode switch being in the active position and an operating button being depressed;
disable said driving means from driving the cutting portion in response to the active mode switch being in the disabled position;
receive a signal from the movement sensor;
determine if the signal indicates movement or no movement of the chainsaw;
calculate a time period over which the signal was received in response to determining the signal indicates no movement of the chainsaw;
with the active mode switch in the active position, disable the driving means in response to the time period exceeding a predefined time period;
maintain the driving means disabled, in response to the time period exceeding the predefined time period, until a reactivation signal is received; and
reactivate the driving means to permit driving of the cutting portion in response to receiving the reactivation signal,
wherein the reactivation signal is provided responsive to user actuation of the active mode switch of the chainsaw to the disabled position followed by movement of the active mode switch to the active position.

8. The chainsaw according to claim 7, wherein the controller is further configured to disable the driving means by switching off the chainsaw.

9. The chainsaw according to claim 7, wherein the controller is further configured to determine a time of day and adapt the predefined time period based on the time of day.

10. The chainsaw according to claim 7, wherein the reactivation signal is received from an on/off switch of the chainsaw in combination with the chain guard.

11. The chainsaw according to claim 7, wherein the chainsaw is electric and the driving means is a motor.

12. The chainsaw according to claim 1, wherein the chain guard is operated in a predetermined pattern to provide the reactivation signal.

13. The chainsaw according to claim 7, wherein the chain guard is operated in a predetermined pattern to provide the reactivation signal.

14. The chainsaw according to claim 1, wherein the reactivation signal is provided by pushing the chain guard toward a handle of the chainsaw and then toward the cutting portion.

15. The chainsaw according to claim 7, wherein the reactivation signal is provided by pushing the chain guard toward a handle of the power tool and then toward the cutting portion.

16. The chainsaw according to claim 1, wherein when the active mode switch is in the disabled position, the chain guard is positioned toward the handle of the chainsaw.

17. The chainsaw according to claim 1, wherein when the active mode switch is in the active position, the chain guard is positioned toward the cutting portion of the chainsaw.

18. The chainsaw according to claim 7, wherein when the active mode switch is in the disabled position, the chain guard is positioned toward the handle of the chainsaw.

19. The chainsaw according to claim 7, wherein when the active mode switch is in the active position, the chain guard is positioned toward the cutting portion of the chainsaw.

* * * * *